US008820800B2

(12) United States Patent
Sutton et al.

(10) Patent No.: US 8,820,800 B2
(45) Date of Patent: Sep. 2, 2014

(54) MULTI-WALL CORRUGATED PIPE COUPLINGS AND METHODS

(75) Inventors: Gerald S. Sutton, Hamilton, OH (US); William V. Shaffer, West Chester, OH (US); James B. Goddard, Powell, OH (US); John M. Kurdziel, Fort Wayne, IN (US); David J. Kelley, Hamilton, OH (US); Jeffrey J. Biesenberger, Columbus, OH (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 230 days.

(21) Appl. No.: 11/941,605

(22) Filed: Nov. 16, 2007

(65) Prior Publication Data
US 2009/0127852 A1    May 21, 2009

(51) Int. Cl.
*F16L 17/00*        (2006.01)
(52) U.S. Cl.
USPC .......................................... 285/374; 285/903
(58) Field of Classification Search
USPC .................................. 285/374, 903
See application file for complete search history.

(56) References Cited

U.S. PATENT DOCUMENTS

| 2,700,631 A | 1/1955 | Sussenbach et al. |
| 2,753,596 A | 7/1956 | Bailey |
| 2,877,150 A | 3/1959 | Wilson |
| 2,888,954 A | 6/1959 | Gates |
| 2,931,069 A | 4/1960 | McCormick |
| 3,081,102 A | 3/1963 | Murray et al. |
| 3,379,805 A | 4/1968 | Roberts |
| 3,490,496 A | 1/1970 | Stearns |
| 3,538,209 A | 11/1970 | Hegler |
| 3,573,871 A | 4/1971 | Warner |
| 3,605,232 A | 9/1971 | Hines |
| 3,649,730 A | 3/1972 | Lachenmayer et al. |
| 3,677,676 A | 7/1972 | Hegler |
| 3,725,565 A | 4/1973 | Schmidt |

(Continued)

FOREIGN PATENT DOCUMENTS

| DE | 1 278 734 | 9/1968 |
| DE | 2 042 031 | 8/1970 |

(Continued)

OTHER PUBLICATIONS

Foerst, Dr. Wilhelm, Ullmanns Encyklopädie der technischen Chemia, Urban & Schwarzenberg, Munchen, Berlin, Germany, pp. 52-53, 71-73, 1960.

(Continued)

*Primary Examiner* — Aaron Dunwoody
(74) *Attorney, Agent, or Firm* — Finnegan Henderson Farabow Garrett & Dunner, L.L.P.

(57) ABSTRACT

A coupling for multi-wall, corrugated pipe, the pipe including a corrugated wall having a plurality of primary corrugations, is disclosed. The coupling includes a first pipe section having disposed at one end a bell portion, the bell portion having a portion of the corrugated wall and an outer wall; a second pipe section having disposed at one end a spigot portion, the spigot portion having a portion of the corrugated wall between an inner wall and an outer wall; and a gasket engaged between the corrugated wall of the bell portion and the outer wall of the spigot portion. A multi-wall, corrugated pipe section, and method for assembling a plurality of multi-wall, corrugated pipe sections, are also disclosed.

23 Claims, 3 Drawing Sheets

(56) References Cited

U.S. PATENT DOCUMENTS

| | | | |
|---|---|---|---|
| 3,802,908 A | 4/1974 | Emmons | |
| 3,819,292 A | 6/1974 | Wentworth | |
| 3,824,886 A | 7/1974 | Hegler | |
| 3,837,364 A | 9/1974 | Jenner | |
| 3,869,235 A | 3/1975 | Moore | |
| 3,944,641 A | 3/1976 | Lemelson | |
| 3,957,386 A | 5/1976 | Lupke | |
| 3,958,425 A | 5/1976 | Maroschak | |
| 4,037,626 A * | 7/1977 | Roberts, Jr. | 138/109 |
| 4,042,661 A | 8/1977 | Cook | |
| 4,113,411 A | 9/1978 | Terragni | |
| 4,165,214 A | 8/1979 | Lupke et al. | |
| 4,180,357 A | 12/1979 | Lupke | |
| 4,218,164 A | 8/1980 | Lupke | |
| 4,219,293 A | 8/1980 | Licht | |
| 4,220,181 A | 9/1980 | Nyssen | |
| 4,223,895 A | 9/1980 | Roberts, Jr. et al. | |
| 4,230,157 A | 10/1980 | Larsen et al. | |
| 4,262,162 A | 4/1981 | Plinke et al. | |
| 4,281,981 A | 8/1981 | Feldman | |
| 4,319,476 A | 3/1982 | Fuchs, Jr. | |
| 4,352,701 A | 10/1982 | Shimba et al. | |
| 4,377,545 A * | 3/1983 | Hornbeck | 264/167 |
| 4,397,797 A | 8/1983 | Nojiri et al. | |
| 4,402,658 A | 9/1983 | Larsen | |
| 4,415,389 A | 11/1983 | Medford et al. | |
| 4,436,679 A | 3/1984 | Winstead | |
| 4,439,130 A | 3/1984 | Dickhut et al. | |
| 4,492,551 A | 1/1985 | Hegler et al. | |
| 4,523,613 A | 6/1985 | Fouss et al. | |
| 4,528,832 A | 7/1985 | Fuchs, Jr. | |
| 4,534,923 A | 8/1985 | Lupke | |
| 4,547,246 A | 10/1985 | Viriyayuthakorn et al. | |
| 4,562,990 A | 1/1986 | Rose | |
| 4,572,523 A | 2/1986 | Guettouche et al. | |
| 4,588,546 A | 5/1986 | Feil et al. | |
| 4,666,649 A | 5/1987 | Takubo et al. | |
| 4,678,526 A | 7/1987 | Hawerkamp | |
| 4,683,166 A | 7/1987 | Yuto et al. | |
| 4,703,639 A | 11/1987 | Fuchs, Jr. | |
| 4,756,339 A | 7/1988 | Buluschek | |
| 4,779,651 A * | 10/1988 | Hegler et al. | 138/109 |
| 4,789,327 A | 12/1988 | Chan et al. | |
| 4,808,098 A | 2/1989 | Chan et al. | |
| 4,846,660 A | 7/1989 | Drossbach | |
| 4,849,113 A | 7/1989 | Hills | |
| 4,854,416 A | 8/1989 | Lalikos et al. | |
| 4,862,728 A | 9/1989 | Hardouin | |
| 4,862,924 A | 9/1989 | Kanao | |
| 4,900,503 A | 2/1990 | Hegler et al. | |
| 4,906,496 A | 3/1990 | Hosono et al. | |
| 4,913,473 A * | 4/1990 | Bonnema et al. | 285/423 |
| 4,970,351 A | 11/1990 | Kirlin | |
| 5,045,254 A | 9/1991 | Peelman et al. | |
| 5,058,934 A | 10/1991 | Brannon | |
| 5,089,074 A | 2/1992 | Winter et al. | |
| 5,124,109 A | 6/1992 | Drossbach | |
| 5,129,428 A | 7/1992 | Winter et al. | |
| 5,129,429 A | 7/1992 | Winter et al. | |
| 5,129,685 A | 7/1992 | Engel | |
| 5,145,545 A | 9/1992 | Winter et al. | |
| 5,156,901 A | 10/1992 | Tanaka | |
| 5,192,834 A | 3/1993 | Yamanishi et al. | |
| 5,222,288 A | 6/1993 | Thomas | |
| 5,228,479 A | 7/1993 | Thomas | |
| 5,256,233 A | 10/1993 | Winter et al. | |
| 5,262,109 A | 11/1993 | Cook | |
| 5,275,544 A | 1/1994 | Marlowe | |
| 5,279,332 A | 1/1994 | Winter et al. | |
| 5,314,553 A | 5/1994 | Hashimoto et al. | |
| 5,326,138 A * | 7/1994 | Claes et al. | 285/110 |
| 5,330,600 A | 7/1994 | Lupke | |
| 5,346,384 A | 9/1994 | Hegler et al. | |
| 5,348,051 A | 9/1994 | Kallenbach | |
| 5,372,774 A | 12/1994 | Lupke | |
| 5,383,497 A | 1/1995 | Winter et al. | |
| 5,383,998 A | 1/1995 | Lupke | |
| 5,391,334 A | 2/1995 | Enomoto | |
| 5,394,904 A | 3/1995 | Winter et al. | |
| 5,441,083 A | 8/1995 | Korsgaard | |
| 5,460,771 A | 10/1995 | Mitchell et al. | |
| 5,462,090 A | 10/1995 | Winter et al. | |
| 5,466,402 A | 11/1995 | Lupke | |
| 5,469,892 A | 11/1995 | Noone et al. | |
| 5,472,659 A | 12/1995 | Hegler et al. | |
| 5,472,746 A | 12/1995 | Miyajima et al. | |
| 5,522,718 A | 6/1996 | Dietrich | |
| 5,531,952 A | 7/1996 | Hatfield | |
| 5,545,369 A | 8/1996 | Lupke | |
| 5,572,917 A | 11/1996 | Truemner et al. | |
| 5,608,637 A | 3/1997 | Wang et al. | |
| 5,620,722 A | 4/1997 | Spina | |
| 5,649,713 A | 7/1997 | Ledgerwood | |
| 5,706,864 A | 1/1998 | Pfleger | |
| 5,715,870 A | 2/1998 | Winter et al. | |
| 5,759,461 A | 6/1998 | Jarvenkyla et al. | |
| 5,773,044 A | 6/1998 | Dietrich et al. | |
| 5,848,618 A | 12/1998 | Guest | |
| 5,894,865 A | 4/1999 | Winter et al. | |
| 5,901,754 A | 5/1999 | Elsässer et al. | |
| 5,904,643 A | 5/1999 | Seeberger et al. | |
| 5,909,908 A | 6/1999 | Furuse | |
| 5,912,023 A | 6/1999 | Katoh et al. | |
| 5,975,143 A | 11/1999 | Järvenkyläet al. | |
| 5,976,298 A | 11/1999 | Hegler et al. | |
| 5,992,469 A * | 11/1999 | Hegler | 138/109 |
| 6,000,434 A | 12/1999 | Winter et al. | |
| 6,016,848 A | 1/2000 | Egres, Jr. | |
| 6,039,082 A | 3/2000 | Winter et al. | |
| 6,062,268 A | 5/2000 | Elsässer et al. | |
| 6,082,741 A | 7/2000 | Gregoire et al. | |
| 6,126,209 A * | 10/2000 | Goddard | 285/347 |
| 6,161,591 A | 12/2000 | Winter et al. | |
| 6,186,182 B1 | 2/2001 | Yoon | |
| 6,199,592 B1 * | 3/2001 | Siferd et al. | 138/109 |
| 6,240,969 B1 | 6/2001 | Wildermuth | |
| 6,335,101 B1 | 1/2002 | Haeger et al. | |
| 6,343,623 B2 * | 2/2002 | Hegler | 138/109 |
| 6,399,002 B1 * | 6/2002 | Lupke et al. | 264/139 |
| 6,405,974 B1 | 6/2002 | Herrington | |
| 6,458,311 B1 * | 10/2002 | Hegler | 264/508 |
| 6,461,078 B1 | 10/2002 | Presby | |
| 6,491,994 B1 | 12/2002 | Kito et al. | |
| 6,524,519 B1 | 2/2003 | Ohba et al. | |
| 6,550,775 B2 * | 4/2003 | Knapp | 277/314 |
| 6,555,243 B2 | 4/2003 | Flepp et al. | |
| 6,565,350 B2 * | 5/2003 | Siferd et al. | 425/393 |
| 6,578,608 B2 * | 6/2003 | Hegler | 138/109 |
| 6,578,882 B2 * | 6/2003 | Toliver | 285/374 |
| 6,591,871 B2 | 7/2003 | Smith et al. | |
| 6,607,010 B1 | 8/2003 | Kashy | |
| 6,631,741 B2 | 10/2003 | Katayama et al. | |
| 6,645,410 B2 | 11/2003 | Thompson | |
| 6,660,199 B2 * | 12/2003 | Siferd et al. | 264/150 |
| 6,682,677 B2 | 1/2004 | Lobovsky et al. | |
| 6,696,011 B2 | 2/2004 | Yun et al. | |
| 6,719,302 B2 | 4/2004 | Andrick | |
| 6,787,092 B2 | 9/2004 | Chan et al. | |
| 6,848,464 B2 | 2/2005 | Ransom | |
| 6,848,478 B2 | 2/2005 | Nagai | |
| 6,854,168 B2 | 2/2005 | Booms et al. | |
| 6,854,925 B2 * | 2/2005 | DiTullio | 405/49 |
| 6,933,028 B2 | 8/2005 | Milhas | |
| 6,935,378 B2 | 8/2005 | Ikemoto et al. | |
| 6,941,972 B2 * | 9/2005 | Toliver et al. | 138/26 |
| 6,955,780 B2 | 10/2005 | Herrington | |
| 7,017,614 B2 * | 3/2006 | Handley | 138/109 |
| 7,074,027 B2 | 7/2006 | Starita | |
| 7,104,574 B2 * | 9/2006 | Dukes et al. | 285/370 |
| 7,114,944 B2 | 10/2006 | Wolfe et al. | |
| 7,118,369 B2 | 10/2006 | Dietrich et al. | |
| 7,122,074 B2 | 10/2006 | Kim | |
| 7,140,859 B2 | 11/2006 | Herrington | |
| 7,156,128 B1 * | 1/2007 | Kanao | 138/133 |

(56) References Cited

U.S. PATENT DOCUMENTS

| | | | |
|---|---|---|---|
| 7,185,894 B2 | 3/2007 | Kish et al. | |
| 7,238,317 B2 * | 7/2007 | Hegler | 264/508 |
| 7,306,264 B2 * | 12/2007 | Goddard et al. | 285/374 |
| 7,347,225 B2 | 3/2008 | Nobileau | |
| 7,434,850 B2 * | 10/2008 | Duininck et al. | 285/374 |
| 7,484,535 B2 * | 2/2009 | Goddard et al. | 138/121 |
| 7,600,793 B2 * | 10/2009 | Hegler | 285/399 |
| 2001/0013673 A1 * | 8/2001 | Siferd et al. | 264/322 |
| 2002/0060454 A1 * | 5/2002 | Toliver | 285/374 |
| 2002/0179232 A1 | 12/2002 | Thompson | |
| 2003/0090106 A1 * | 5/2003 | Goddard et al. | 285/252 |
| 2003/0090112 A1 * | 5/2003 | Baughman et al. | 285/903 |
| 2004/0146696 A1 | 7/2004 | Jones | |
| 2004/0187946 A1 | 9/2004 | Herrington | |
| 2004/0241368 A1 | 12/2004 | Iwata et al. | |
| 2004/0262923 A1 * | 12/2004 | Hegler | 285/374 |
| 2005/0161947 A1 * | 7/2005 | Skinner et al. | 285/374 |
| 2006/0293159 A1 | 12/2006 | Neubauer | |
| 2007/0075544 A1 * | 4/2007 | Duininck et al. | 285/374 |
| 2007/0204929 A1 | 9/2007 | Jarvenkyla | |
| 2008/0118596 A1 | 5/2008 | Hetzner et al. | |

FOREIGN PATENT DOCUMENTS

| | | |
|---|---|---|
| DE | 1 704 718 | 7/1971 |
| DE | 2 042 031 | 5/1972 |
| DE | 2 413 878 | 2/1976 |
| DE | 2 403 618 | 12/1980 |
| DE | 2 804 540 C2 | 1/1984 |
| DE | 297 06 045 | 6/1997 |
| EP | 0 041 252 | 12/1981 |
| EP | 0 096 957 B1 | 5/1989 |
| EP | 0 385 465 A2 | 3/1990 |
| EP | 0 385 465 B1 | 3/1990 |
| EP | 0 581 064 A1 | 7/1993 |
| EP | 0 726 134 B1 | 2/1996 |
| EP | 0 543 243 B1 | 2/1997 |
| EP | 0 600 214 B1 | 3/1998 |
| EP | 0 890 770 A2 | 5/1998 |
| EP | 0 890 770 B1 | 5/1998 |
| EP | 1 293 718 A2 | 3/2003 |
| EP | 0 600 214 B2 | 4/2006 |
| FR | 1 486 473 | 6/1967 |
| GB | 1148277 | 4/1967 |
| GB | 1 148 277 | 4/1969 |
| GB | 2 300 684 | 11/1996 |
| JP | 56144943 | 11/1981 |
| JP | 57160518 | 10/1982 |
| JP | 58168422 | 10/1983 |
| JP | 59 026224 | 2/1984 |
| JP | 59114027 | 6/1984 |
| JP | 61135416 | 6/1986 |
| JP | 06 64062 | 3/1994 |
| JP | 08-258175 | 10/1996 |
| JP | 08-258176 | 10/1996 |
| JP | 08 267128 | 10/1996 |
| JP | 2003062891 | 3/2003 |
| WO | WO 85/00140 | 1/1985 |
| WO | WO 98/12046 | 3/1998 |
| WO | WO 01/79737 A1 | 10/2001 |
| WO | WO 2004/094888 A1 | 11/2004 |

OTHER PUBLICATIONS

U.S. Appl. No. 11/078,323, filed Mar. 14, 2005, entitled "Corrugated Pipe with Outer Layer".

Non-final Office Action dated Jul. 3, 2007, in U.S. Appl. No. 11/078,323.

Final Office Action dated Dec. 27, 2007, in U.S. Appl. No. 11/078,323.

Non-final Office Action dated May 29, 2008, in U.S. Appl. No. 11/078,323.

*Modern Plastics Worldwide*, Apr. 2008 edition, p. 35, "Device offers alternative for constant flow filtration."

Written Opinion mailed on Jan. 15, 2009, in International Application No. PCT/US2008/012676.

International Search Report mailed on Jan. 15, 2009, in International Application No. PCT/US2008/012676.

* cited by examiner

MULTI-WALL CORRUGATED PIPE COUPLINGS AND METHODS

FIELD OF THE INVENTION

The present invention relates to three-wall corrugated pipe couplings and methods, and more particularly, to a water-tight, in-line, bell and spigot for coupling three-wall corrugated pipe.

BACKGROUND OF THE INVENTION

Corrugated pipe sections are used in the drainage of water-saturated soil in various agricultural, residential, recreational, or civil engineering and construction applications, such as for storm sewers. Traditionally, drainage pipe was made from clay or concrete, which caused the pipe to be heavy, expensive, and brittle. In order to improve the cost-effectiveness, durability, and ease-of-installation of drainage pipes, it is now common in the art to manufacture them from various materials including various polymers and polymer blends.

Such plastic drainage pipe is generally extruded, molded, and cut to form relatively light, manageable, and transportable sizes of drainage pipe sections, ranging from a few feet to many yards in length. Once these plastic pipe sections are transported to their desired installation location, they are assembled lengthwise by the installation of joints, adhesives, or other coupling means. This coupling process has generally been complex, requiring the transportation of many tools and supplies to the job site, and has required many man-hours for completion.

For example, one method of assembly involves the formation of a wide-diameter bell at one end of each plastic pipe section. During the pipe manufacturing process, an apparatus known as a "beller" is used to radially expand the end of the pipe, forming an expanded bell-shaped structure, such that the opposite end of an adjacent pipe section may be inserted into the expanded bell-shaped end. This process has several disadvantages.

First of all, these pipe bells are generally weakened during their expansion and require additional means of reinforcement, such as external straps, hinged brackets, overlapping wraps, shrink-wrap layers, or a combination of such reinforcement means. In some instances, more material must be used at the pipe bell ends to compensate for reduced strength, thereby increasing weight and expense. Moreover, because the pipe bells are expanded to diameters larger than the central portion of the pipe, it becomes necessary to dig trenches that can accommodate the larger bell. Finally, these bells and other known coupling means require precise and careful excavation, installation, and backfill, to avoid misalignment between pipe sections during assembly and placement. The improper installation of these coupling means often results in joint failure, buckling, and an inability to form a water-tight seal between adjacent pipe sections.

The above problems, which are known to exist in relation to single- and dual-wall pipe, can be even more troublesome in three-wall pipe applications. For example, it may be substantially more difficult and expensive to form a bell-shaped end on a section of three-wall, corrugated pipe, due to increased material weight and stiffness.

Accordingly, there is a need for an improved water-tight, in-line, bell and spigot, which can be used for coupling sections of three-wall, corrugated pipe.

SUMMARY OF THE INVENTION

It is an object of the present invention to provide such an improved water-tight, in-line, bell and spigot design for coupling adjacent sections of three-wall corrugated pipe.

One exemplary embodiment of the present disclosure provides a coupling for three-wall, corrugated pipe, the pipe including a corrugated wall having a plurality of primary corrugations. The coupling includes: a first pipe section having disposed at one end a bell portion, the bell portion having a portion of the corrugated wall and an outer wall; a second pipe section having disposed at one end a spigot portion, the spigot portion having a portion of the corrugated wall between an inner wall and an outer wall; and a gasket engaged between the portion of the corrugated wall of the bell portion and the outer wall of the spigot portion.

Another exemplary embodiment provides a three-wall, corrugated pipe section design. The corrugated pipe section includes: a spigot portion disposed at a first end of the corrugated pipe section; a bell portion disposed at a second end of the corrugated pipe section; and a central portion disposed between the spigot portion and the bell portion, the central portion having a corrugated wall disposed between an inner wall and an outer wall.

Yet another exemplary embodiment of the present invention provides a method of coupling three-wall, corrugated pipe. The method includes: providing a first three-wall, corrugated pipe section, having disposed at one end a spigot portion, the spigot portion having a portion of the corrugated wall between an inner wall and an outer wall; providing a second three-wall, corrugated pipe section, having disposed at one end a bell portion, the bell portion having a portion of the corrugated wall and an outer wall; engaging a gasket with corrugations in the corrugated wall of the bell portion; and inserting the spigot portion into the bell portion such that the outer wall of the spigot portion engages the gasket.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

The accompanying drawings illustrate certain exemplary embodiments of the invention, and together with the description, serve to explain the principles of the invention.

As such, those skilled in the art will appreciate that the conception upon which this disclosure is based may readily be utilized as a basis for designing other structures, methods, and systems for carrying out the several purposes of the present invention. It is important, therefore, to recognize that the claims should be regarded as including such equivalent constructions insofar as they do not depart from the spirit and scope of the present invention.

DESCRIPTION OF THE EXEMPLARY EMBODIMENTS

Reference will now be made in detail to the exemplary embodiments of the invention described above and illustrated in the accompanying drawings.

Figure 1:
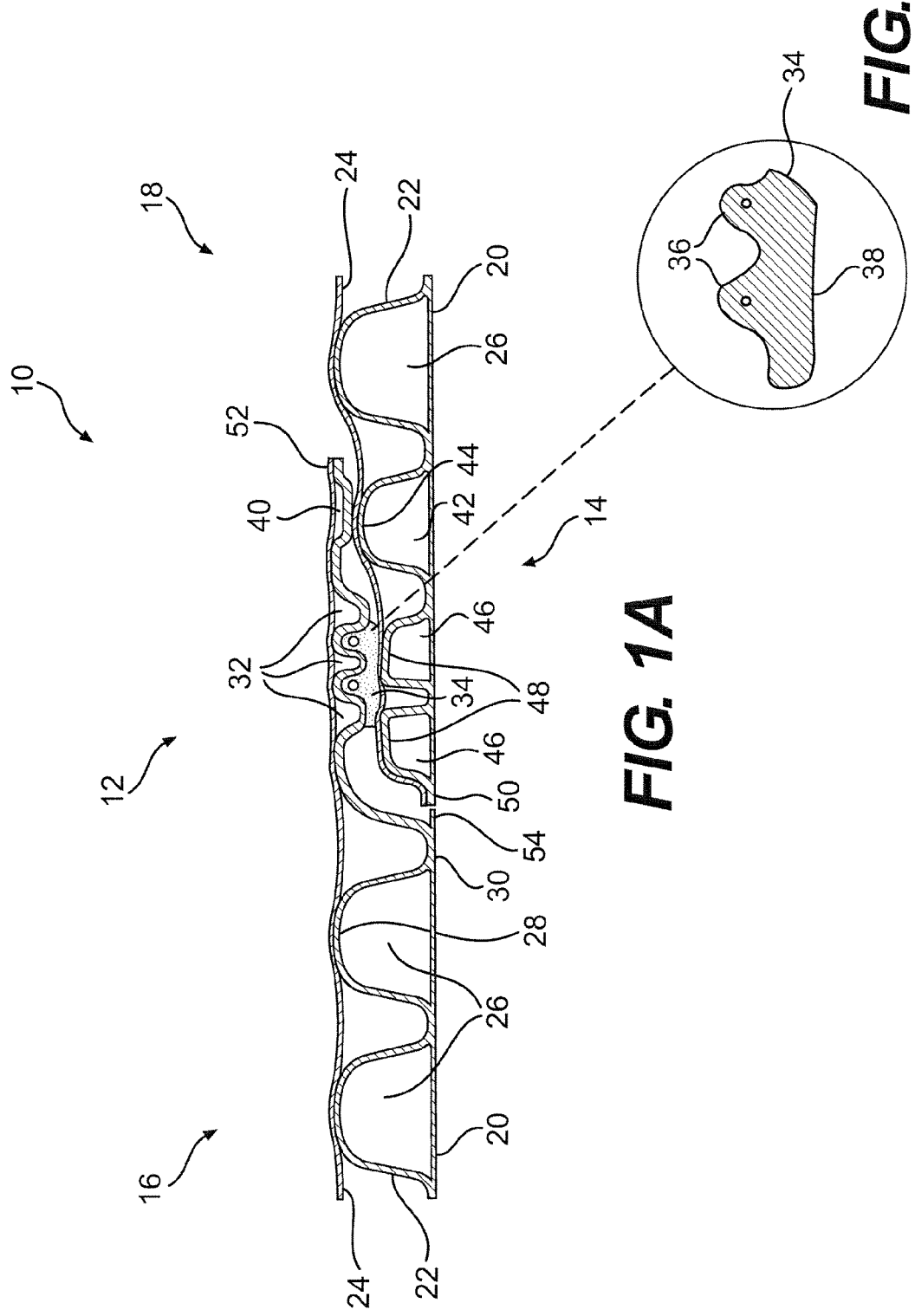
FIG. 1A is a partial, cross-sectional view of an exemplary coupling for joining two segments of three-wall, corrugated pipe.
FIG. 1B is a cross-sectional view of an exemplary gasket for use in the coupling of FIG. 1A.

FIG. 1A illustrates an exemplary coupling portion 10 for coupling a first corrugated pipe section 16 and a second corrugated pipe section 18. In general, coupling portion 10 may include a bell portion 12 disposed on an end of first corrugated pipe section 16 and a spigot portion 14 disposed on an end of second corrugated pipe section 18. Coupling portion 10 may also include a gasket 34, for retaining and sealing spigot portion 14 within bell portion 12.

In one embodiment, first and second corrugated pipe sections 16, 18 may be initially formed as dual-wall, corrugated pipe. For example, both first and second corrugated pipe sections 16, 18 include an inner wall 20 and a corrugated wall 22, which may be formed together on a corrugator. In another embodiment of the present invention, inner wall 20 may be separately fused to corrugated wall 22. Corrugated wall 22 may include a plurality of primary corrugations 26, each having respective primary corrugation crests 28 and primary corrugation valleys 30. This dual-wall, corrugated pipe may then be passed through a downstream, cross-head die, which extrudes an outer wall 24 onto the dual-wall pipe, as illustrated in FIG. 1A, thereby creating three-wall, corrugated pipe. Because outer wall 24 is extruded onto corrugated wall 22 while it is still hot (i.e., in a melted or semi-melted state), it may be fused or covalently bonded to primary corrugation crests 28 of corrugated wall 22. In certain exemplary embodiments, inner wall 20 may be substantially smooth, as illustrated in FIG. 1A.

Referring in particular to coupling portion 10, bell portion 12 and spigot portion 14 may be formed integrally with three-wall corrugated pipe, such that their assembly results in a coupling having a diameter substantially similar to that of the rest of the pipe. In other words, the outer diameter of the three-wall corrugated pipe may be substantially the same at the bell and spigot portions 12, 14 as the outer diameter at various locations of primary corrugations 26.

Specifically, as illustrated in FIG. 1A, bell portion 12 may include outer wall 24 and a portion of corrugated wall 22 having smaller bell corrugations 32 formed therein. For example, bell portion 12 may include three bell corrugations 32, which are configured to engage and retain protrusions 36 of gasket 34, as illustrated in FIG. 1B. Bell portion 12 may also include an end corrugation 40 disposed proximate to an end portion of the bell, i.e., between bell corrugations 32 and bell terminus 52. As further illustrated in FIG. 1A, the height of bell corrugations 32, measured from the outer wall to the bottoms of the bell corrugations 32, may be substantially less than the primary height of primary corrugations 26, measured from the outer wall to the bottoms of the primary corrugations 26 (primary corrugation valleys 30). Moreover, the height of end corrugation 40, measured from the outer wall to the bottom of end corrugation 40, may be even less than the height of bell corrugations 32. End corrugation 40 may have a different shape than that of primary corrugations 26 and bell corrugations 32. More specifically, end corrugation 40 may have a substantially rectangular shape. Because of the reduction in height of bell corrugations 32, without a change in outside pipe diameter, first corrugated pipe section 16 may form an in-line, bell-shaped portion for receiving spigot portion 14.

Spigot portion 14 may include inner wall 20, a portion of corrugated wall 22 having smaller spigot corrugations 46 formed therein, and a portion of outer wall 24 drawn down over spigot corrugations 46. Spigot portion 14 may also include an intermediate corrugation 42 disposed between spigot corrugations 46, located adjacent spigot terminus 50, and primary corrugations 26 of second corrugated pipe section 18. As illustrated in FIG. 1A, the height of spigot corrugations 46, measured from inner wall 20 to the top of spigot corrugations 46 (spigot corrugation crests 48), may be less than the height of intermediate corrugation 42, measured from inner wall 20 to the top of intermediate corrugation 42 (intermediate corrugation crest 44). Accordingly, the height of intermediate corrugation 42 may be less than the height of primary corrugations 26. Thus, outer wall 24 may be circumferentially tapered over spigot portion 14.

As illustrated in the embodiment of FIG. 1A, primary corrugations 26 and intermediate corrugation 42 may have generally curved shapes, including rounded shoulder portions. Likewise, spigot corrugations 46 may have generally curved profile shapes. Alternatively, each of the spigot corrugations 46 may include at least one substantially sharp corner, thereby forming a relatively right angle, shoulder portion. Thus, spigot corrugations 46 may each further include at least one substantially straight side. Because of the reduction in corrugation height in the direction approaching spigot terminus 50, a decreased-diameter spigot portion 14 may be formed so as to telescopically engage the bell portion 12.

Upon proper dimensional control of bell portion 12 and spigot portion 14, a water-tight seal may be formed therebetween. For instance, as illustrated in FIG. 1A, end corrugation 40 of bell portion 12 may contact the portion of outer wall 24 fused to intermediate corrugation 42 of spigot portion 14. Likewise, referring to FIG. 1B, an inner sealing surface 38 of gasket 34 may contact a portion of outer wall 24 fused to one or more of spigot corrugations 46.

In the embodiment of FIG. 1A, gasket 34 engages a surface of outer wall 24 spanning two spigot corrugations 46. In alternative embodiments of the present disclosure, it is contemplated that gasket 34 may be configured to engage only one spigot corrugation 46 or many spigot corrugations 46. For example, in the event that gasket 34 engages a single spigot corrugation 46, it may be necessary to fill the corrugation with foam, or any other suitable reinforcing material to ensure sufficiently resilient support of gasket 34. For this reason, two smaller spigot corrugations 48, such as those illustrated in FIG. 1A, may be used to provide increased structural support (i.e., vertical corrugation walls) for sealing against gasket 34. Moreover, the length of sealing engagement between gasket 34 and outer wall 24 of spigot portion 14 may be any suitable length; however, in one exemplary embodiment, spigot corrugations 46 extend axially across 4-8 inches of pipe and are fused to a portion of outer wall 24. Gasket 34 may extend and overlap approximately 3-4 inches in the axial pipe direction of the portion of outer wall 24 fused to spigot corrugations 46, gasket 34 having a sealing surface 38 approximately 2-4 inches long. Thus, sealing surface 38 of gasket 34 may be configured to engage the outer wall 24 of spigot portion 14.

Gasket 34 may be any suitable type of annular, water-tight gasket. For example, gasket 34 may be a dual-elastomer gasket including any suitable type of material, such as rubber, polyethylene, Teflon, EPDM, nitrile, thermoplastic elastomers, isoprene, or other plastic compounds. Gasket 34 may also incorporate various metal inserts or rings, as necessary, to provide structural rigidity.

Figure 2:
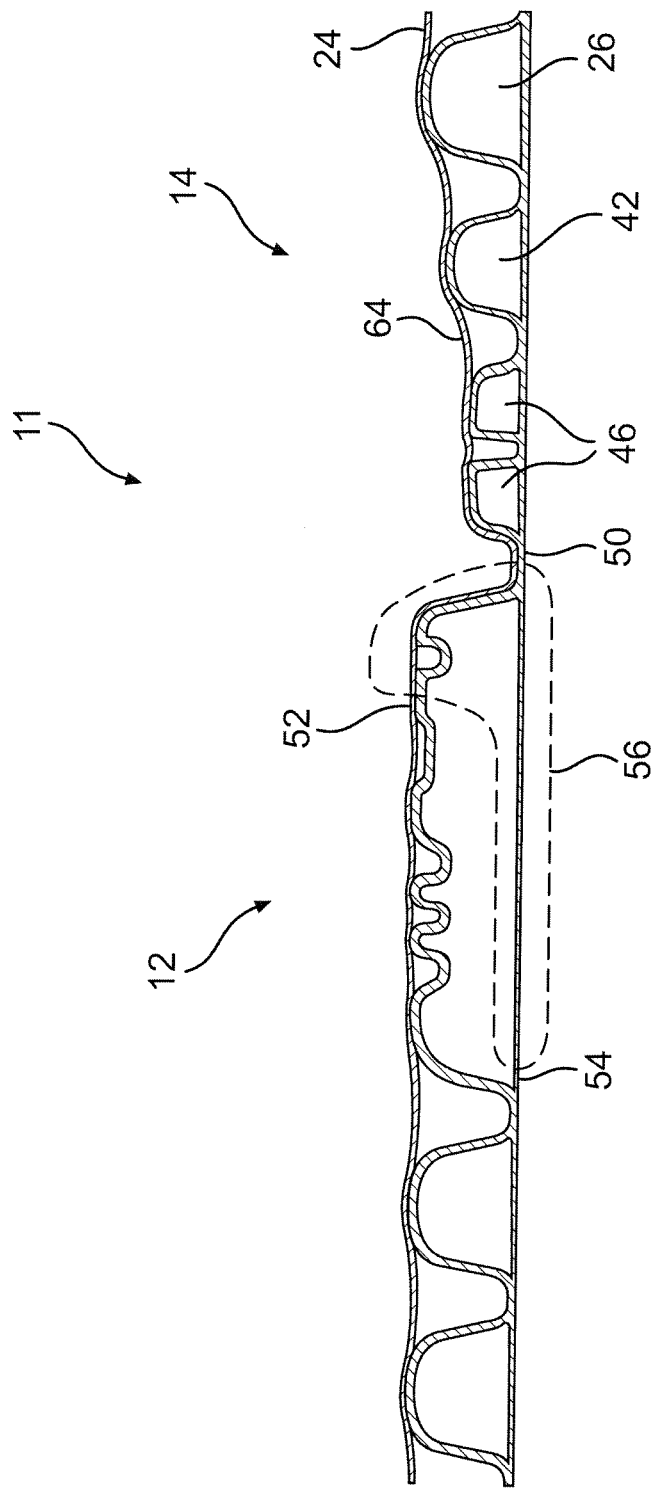
FIG. 2 is a partial, cross-sectional view of an exemplary extruded, three-wall, corrugated pipe having a molded preform therein, which can be formed into a coupling.

FIG. 2 illustrates an exemplary, partial section of three-wall, corrugated pipe during manufacturing of a coupling preform 11 prior to cutting of the pipe. As described above with respect to FIG. 1A, coupling portion 10, including bell portion 12 and spigot portion 14, may be formed "in-line" with the rest of the three-wall corrugated pipe. Accordingly, FIG. 2 illustrates a coupling preform 11, having bell portion 12 and spigot portion 14 of three-wall, corrugated pipe, after having been extruded from a cross-head die but before having been cut into separate portions. As illustrated in FIG. 2, a portion of outer wall 24 constituting spigot outer wall 64 has been drawn down over, and fused or covalently bonded to, intermediate corrugation 42 and spigot corrugations 46. Moreover, spigot outer wall 64 may be drawn down adjacent to spigot terminus 50, such that all three walls of the corrugated pipe are in contact between spigot portion 14 and bell portion 12 of coupling preform 11. Because the walls have been drawn down together, a scrap portion 56 of coupling preform 11 (indicated by dashed lines on FIG. 2) may be easily removed by making cuts proximate to spigot terminus 50, bell terminus 52, and inner wall terminus 54.

Any suitable method may be used for drawing down outer wall 24 onto various corrugations or valleys of corrugated wall 22. For example, in one embodiment, a plurality of rollers may be used to press outer wall 24 onto primary corrugations 26, intermediate corrugation 42, and spigot corrugations 46. Alternatively, in another embodiment, vacuum suction may be applied, for example, by a hollow needle, between corrugation crests to create downward force on outer wall 24, as desired. In order to facilitate this vacuum deformation, various channels and access passageways may be incorporated into the molds, used to shape the outer and/or corrugated walls, as necessary.

Figure 3:
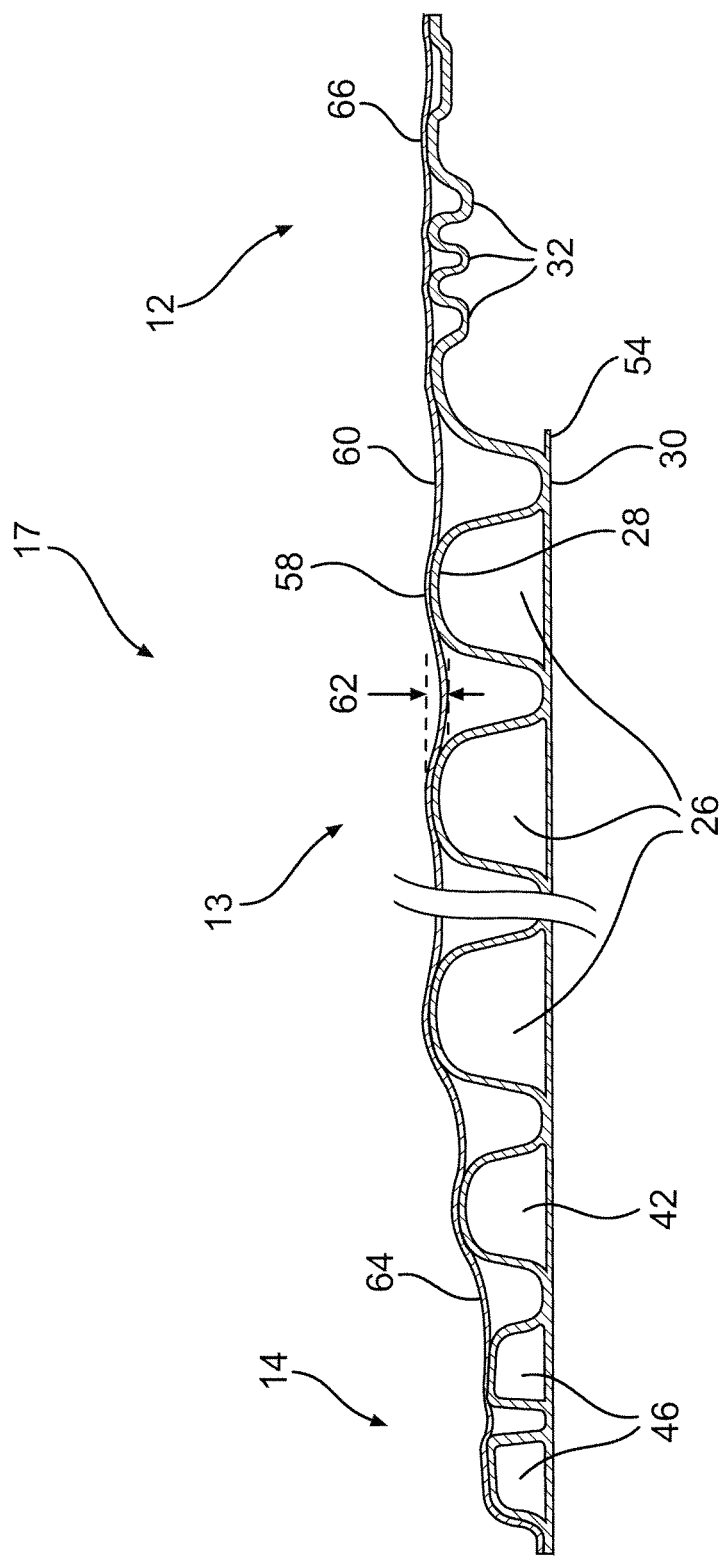
FIG. 3 is a partial, cross-sectional view of an exemplary three-wall pipe having an in-line, bell and spigot formed therein.

FIG. 3 illustrates an exemplary embodiment of a corrugated pipe section 17, having bell portion 12 at a first end and spigot portion 14 at a second end. A primary pipe portion 13, having primary corrugations 26, may be disposed between bell portion 12 and spigot portion 14. Primary pipe portion 13 may extend from a few feet to many yards in length.

In certain embodiments, each corrugated pipe section 17 may be manufactured such that its outer wall 24 (including spigot outer wall 64 and bell outer wall 66) is at least partially corrugated. For example, outer wall 24 may include a plurality of outer wall crests 58 and outer wall valleys 60. As illustrated in FIG. 3, outer wall crests 58 may be axially aligned with primary corrugation crests 28, while outer wall valleys 60 may be axially aligned with primary corrugation valleys 30. Alternatively, in another embodiment, outer wall crests 58 may be aligned with primary corrugation valleys 30, whereas outer wall valleys 60 may be aligned with primary corrugation crests 28. In one embodiment, the radial distance from the top of an outer wall crest to the bottom of an adjacent outer wall valley (i.e., the "wave height") may be between 0.0 and 0.25 inches. In a further embodiment, the wave height may be between 0.15 and 0.25 inches.

Upon the manufacture of a plurality of corrugated pipe sections 17, such as the pipe section illustrated in FIG. 3, a system of corrugated pipes may be quickly and easily arranged and coupled lengthwise, from end to end. Specifically, spigot portion 14 of a first corrugated pipe section may be inserted into bell portion 12 of a second pipe section, as discussed with respect to FIG. 1A.

As will be appreciated by one of skill in the art, the presently disclosed coupling, pipe section, and methods may enjoy numerous advantages over previously known pipe coupling systems. First of all, because spigot portion 14 includes three walls (i.e., inner wall 20, corrugated wall 22, and outer wall 24), one of ordinary skill in the art would expect spigot portion 14 to be substantially stronger than previously known spigots. Specifically, spigot portion 14 may be made more rigid, without the use of extensive or excessive amounts of material. Similarly, because bell portion 12 includes two layers (i.e., outer wall 24 and corrugated wall 22), one of skill in the art would expect bell portion 12 to be substantially stronger than previously known bells formed from a single layer of material. In particular, bell portion 12 and spigot portion 14 may be stronger than competing products that require the use of even more plastic for forming certain pipe wall layers.

Because there may be no significant change in the outer diameter of the pipe proximate to bell portion 12, a substantially constant-dimension trench may be dug along the length of the pipe installation. Moreover, because gasket 34 is disposed on the inner surface of bell portion 12, its elasticity may be used to make installation and retention easier. The resulting smaller gasket reduces material requirements and weight. Thus, spigot portion 14 may be designed in the interests of creating a larger sealing surface on spigot outer wall 64 and a stronger triple-wall structure. This may reduce the probability of misalignment between bell portion 12, spigot portion 14, and gasket 34, and may simplify the installation process.

Thus, an exemplary bell, spigot, and gasket disclosed herein may create an ASHTO-compliant, water-tight coupling, without the need for additional reinforcement means, such as straps, hinged clamps, or wraps. Nevertheless, in some embodiments, it may still be desirable to deform the outer wall of bell portion 12 after inserting spigot portion 14 into the bell portion 12. Finally, an exemplary coupling may be substantially "in-line", thus creating a consistent and simple product, which may be easily transported to a jobsite and installed. This provides advantages in terms of reducing both material supplies and man-hours.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A pipe system comprising:
a first pipe including a first inner wall, a first outer wall, and a first corrugated wall, the first pipe having disposed at one end a bell portion, the bell portion including a portion of the first corrugated wall and a portion of the first outer wall;
a second pipe including a second inner wall, a second outer wall, and a second corrugated wall, the second pipe having disposed at one end a spigot portion, the spigot portion including a portion of the second corrugated wall positioned between a portion of the second inner wall and a portion of the second outer wall, wherein the spigot portion is inserted into the bell portion to couple the first pipe and the second pipe; and
a gasket contacting the portion of the first corrugated wall of the bell portion and the portion of the second outer wall of the spigot portion.

2. The pipe system of claim 1, wherein:
the second corrugated wall includes a plurality of primary corrugations, wherein the spigot portion includes a plurality of spigot corrugations having heights less than heights of the primary corrugations of the second corrugated wall; and
the first corrugated wall includes a plurality of primary corrugations, wherein the bell portion includes a plurality of bell corrugations having heights less than heights of the primary corrugations of the first corrugated wall.

3. The pipe system of claim 2, wherein the portion of the second outer wall of the spigot portion is drawn down onto the spigot corrugations, and the gasket includes protrusions engaged with the bell corrugations, said gasket engaging the portion of the second outer wall of the spigot portion when the spigot portion is inserted into the bell portion.

4. The pipe system of claim 1, wherein, when the spigot portion is inserted into the bell portion, the gasket engages the portion of the second outer wall of the spigot portion.

5. The pipe system of claim 4, wherein the spigot corrugations extend axially over a predetermined length, and the gasket has a sealing surface less than the predetermined length, said sealing surface being configured to engage the portion of the second outer wall of the spigot portion.

6. The pipe system of claim 3, wherein a water-tight interface is formed between a sealing surface of the gasket and the portion of the second outer wall of the spigot portion.

7. The pipe system of claim 2, wherein the portion of the second corrugated wall of the spigot portion further includes an intermediate corrugation disposed between the spigot corrugations and the primary corrugations of the second corrugated wall and having a height greater than the heights of the spigot corrugations and less than the heights of the primary corrugations of the second corrugated wall.

8. The pipe system of claim 7, wherein the portion of the first corrugated wall of the bell portion further includes an end corrugation having a height less than the heights of the bell corrugations, the end corrugation being configured to engage the intermediate corrugation of the spigot portion when the spigot portion is inserted into the bell portion.

9. A pipe system comprising:
a first pipe including a spigot portion, wherein the spigot portion includes a first corrugated wall disposed between a first inner wall and a first outer wall;
a second pipe including a bell portion, wherein the bell portion includes a second corrugated wall affixed to a second outer wall, wherein the second corrugated wall includes a plurality of corrugation crests and a plurality of corrugation valleys, wherein the spigot portion of the first pipe is inserted into the bell portion of the second pipe; and
a gasket retained in at least one corrugation valley of the second corrugated wall.

10. The pipe system of claim 9, wherein the first corrugated wall includes a plurality of primary corrugations having a primary height.

11. The pipe system of claim 10, wherein the first corrugated wall further includes:
a plurality of spigot corrugations having heights less than the primary height of the primary corrugations; and
an intermediate corrugation having a height greater than the height of the spigot corrugations but less than the primary height of the primary corrugations.

12. The pipe system of claim 11, wherein the first corrugated wall includes two spigot corrugations, said two spigot corrugations extending axially together along a length of the pipe between 4 and 8 inches.

13. The pipe system of claim 12, wherein the first outer wall extends across and is fused to the two spigot corrugations and the primary corrugations.

14. The pipe system of claim 11, wherein the first outer wall is fused to the intermediate corrugation and the spigot corrugations, such that a diameter of the spigot portion measured at the intermediate corrugation is less than a diameter of the spigot portion measured at a primary corrugation and greater than a diameter measured at the spigot corrugations.

15. The pipe system of claim 10, wherein the second corrugated wall includes a plurality of primary corrugations and a plurality of bell corrugations having heights less than heights of the primary corrugations of the second corrugated wall, said plurality of bell corrugations being disposed between an end corrugation and the primary corrugations of the second corrugated wall.

16. The pipe system of claim 15, wherein:
the end corrugation extends axially along a length of the second corrugated wall, said end corrugation being longer than each of said plurality of bell corrugations; and
wherein, the end corrugation has a height less than a height of each of the plurality of bell corrugations.

17. The pipe system of claim 9, wherein the first outer wall includes a plurality of corrugations having crests and valleys, said first outer wall crests being aligned with crests of the first corrugated wall and said first outer wall valleys being aligned with valleys of the first corrugated wall, and wherein the second outer wall includes a plurality of corrugations having crests and valleys, said second outer wall crests being aligned with the corrugation crests of the second corrugated wall and said second outer wall valleys being aligned with the corrugation valleys of the second corrugated wall.

18. The pipe system of claim 10, wherein the first inner wall extends to a spigot terminus proximate to the spigot corrugations, and the second inner wall extends to an inner wall terminus proximate to a primary corrugation.

19. A method for assembling a pipe system, the method comprising:
positioning a first pipe, having disposed at one end a spigot portion, the spigot portion including a first corrugated wall disposed between a first inner wall and a first outer wall;
positioning a second pipe, having disposed at one end a bell portion, the bell portion including a second corrugated wall affixed to a second outer wall;
engaging a gasket with corrugations in the second corrugated wall; and
inserting the spigot portion of the first pipe into the bell portion of the second pipe, such that the first outer wall engages the gasket.

20. The method of claim 19, further comprising:
removing a portion of a second inner wall from the second pipe proximate to the bell portion, prior to inserting the spigot portion into the bell portion.

21. The method of claim 19, wherein the second outer wall is circumferentially tapered.

22. The method of claim 19, further comprising:
deforming the second outer wall, after inserting the spigot portion into the bell portion.

23. The method of claim 19, further comprising forming a water-tight interface between a sealing surface of the gasket and the second outer wall when the spigot portion is inserted into the bell portion.

* * * * *